(12) United States Patent
Jibry

(10) Patent No.: US 6,920,003 B2
(45) Date of Patent: Jul. 19, 2005

(54) DATA STORAGE READING DEVICE AND METHOD

(75) Inventor: Rafel Jibry, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 302 days.

(21) Appl. No.: 10/209,856

(22) Filed: Aug. 2, 2002

(65) Prior Publication Data

US 2003/0026032 A1 Feb. 6, 2003

(30) Foreign Application Priority Data

Aug. 3, 2001 (GB) .............................................. 0116068

(51) Int. Cl.⁷ ................................................. G11B 5/09
(52) U.S. Cl. ............................. 360/48; 360/49; 360/51; 360/53; 360/72.1; 714/744; 714/746
(58) Field of Search ............................... 360/48–49, 51, 360/53, 69, 72.1, 72.2–72.3, 39; 365/185.09; 714/744, 746; 386/40

(56) References Cited

U.S. PATENT DOCUMENTS

| 4,081,844 A | * | 3/1978 | Devore et al. ................ 360/48 |
| 6,031,672 A | * | 2/2000 | Bergquist et al. ............ 360/46 |
| 2003/0026020 A1 | * | 2/2003 | Buckingham ................ 360/48 |

FOREIGN PATENT DOCUMENTS

EP 0 831 481 A1 3/1998

* cited by examiner

Primary Examiner—David Hudspeth
Assistant Examiner—Natalia Figueroa

(57) ABSTRACT

A processor processes data read from plural data tracks on a data-containing medium. The data tracks include markers. The processor determines if markers are detected in a predetermined number of the tracks within a predetermined time interval starting with detection of a first marker. In first and second embodiments, the number equals all the read tracks and less than all the read tracks. In the second embodiment, the processor asserts the markers into the data associated with the tracks that do not have detected markers.

37 Claims, 4 Drawing Sheets

DATA STORAGE READING DEVICE AND METHOD

FIELD OF INVENTION

This invention relates to a data reader, a device incorporating such a data reader (in particular a data storage device), and a method of reading data from a data-containing medium.

BACKGROUND ART

It is known to record data in multiple tracks on a data-containing medium, each of which must be successfully read in order to read the data. For example, the LTO tape drive is a known format that records data in multiple tracks.

Generally, processing electronics provided to read data from the tracks has components that must be trained to the data before successful reading of the data can occur. Such components include FIR filters, automatic gain controls, etc. The data recorded in the tracks contain portions that are specifically provided to train these components. If the beginning of these portions are missed by the processing circuitry then successful training of the electronics can fail leading to subsequent failure to read the data.

Prior art solutions have constructed complex detectors that help to ensure that the beginning of the training data is not missed. However, this is not an ideal solution. Providing complex detectors does not guarantee that the beginning of the training will be spotted; it can still be missed and it only helps to reduce the chance of the beginning being missed.

Further, the complexity of the detectors increases the complexity of their manufacture. This increased manufacturing complexity reduces the manufacturing yield, which in turn increases the cost of the detectors.

Thus, the cost is increased not only due to the increased complexity, but also due to the reduced yield.

Yet a further problem is that the as the complexity of the detector increases the period between reading the beginning of the training data and the detector outputting that the beginning has been read increases. Thus, a large latency can be created as the complexity of the detector increases.

It is an aim of the present invention to reduce or remove the problems discussed in relation to the prior art.

SUMMARY OF THE INVENTION

According to a first aspect of the invention, a data reader for reading data containing markers from a plurality of tracks on a data-containing medium is arranged to detect the markers in each of said tracks. The data reader is further arranged to determine that if a predetermined period has elapsed after a marker has been detected in a first one of the tracks whether a marker should have been detected on the or each track.

An advantage of such a data reader is that the likelihood of missing a marker is reduced. This is because data being read from one of the tracks can be used to make inferences about what is going on in the other tracks. When the data are written to the data-containing medium the markers are written to the tracks within a known time of one another. Therefore, if no marker has been detected from a particular track, but a first marker has been detected in another of the tracks, and the known time has elapsed since the first marker has been detected there is an inference that the marker in the particular track has been missed.

It is possible to reduce the complexity of the data reader, because detecting the marker within one track can be assisted by the detection of markers in other tracks. However, it may be desired to maintain the complexity of the reader at a level of that used in the prior art to maintain the probability of detecting the marker within the data.

Preferably, the tracks of data are read concurrently.

The, or each, marker can comprise a sequence of bits. The data reader can be arranged to monitor the marker for a period to determine that it is the marker that the data reader is receiving.

Conveniently, the data reader is arranged to monitor the information on a plurality of tracks and use the nature of the information being received on other tracks to help determine whether a marker has been received on any one track. Such an arrangement is advantageous because it can help to reduce the time necessary to monitor a track to determine whether a marker has been received. Reducing the time for which a track must be monitored helps to reduce the latency of the detector.

The data reader may be arranged to implement a statistical scheme based on whether or not markers have been detected on any of the tracks being read. If a marker has been detected on only a small percentage of the tracks it is unlikely that the marker, or markers, that have been detected are in fact valid. Therefore, statistically, such a marker, or markers, should be discarded. If however, markers have been detected on the majority of tracks within the predetermined period, it is likely that the marker has been missed on the tracks in which no marker has been detected.

The data reader may comprise a separate processing circuit, a track reader, for each of the tracks that it is arranged to read. This is advantageous because it makes the reading of each of the tracks independent from the others.

The track reader may contain a portion that has to be trained before it can read data from the track. The portion requiring training can be a Finite Impulse Response (FIR) filter, and is preferably a synchronous adaptive FIR filter.

Each track reader may be arranged to enter a training mode in which the track reader is trained once a marker has been deemed to be received. This may be actual receipt of a marker, or by a data reader determining that that track should have received a marker due to the time that has elapsed since the first marker has been received.

Conveniently each track reader may include a flag arranged to reflect the nature of the information being read from the track with which it is associated. The flag may comprise a register, a status bit, the state of a state machine, or the like.

If one or more state machines are provided, each state machine may contain a state that is occupied when a marker is being received. Further, each state machine may contain a state that is occupied once a marker has been received. Each state machine may contain yet another state that is occupied when the track reader is waiting to receive a marker.

If the data reader determines that a marker has been missed by any of the track readers, then the data reader may cause that track reader to change the state of the flag to that should a marker have been received. Conversely, if the data reader determines that a track reader has incorrectly determined that a marker has been read it may cause the flag associated with that track to be changed to reflect that a marker is expected.

In other embodiments the data reader may be arranged to time when the flags associated with each track reader change state. An advantage of such an arrangement is that the data reader can determine whether or not the data have been written to the data-containing medium according to the data format.

The data reader may be arranged to adapt the predetermined period for a particular data-containing medium. That is, as the data reader times the period that it usually takes the flags to change to reflect that a marker has been received for all of the tracks it may become apparent that the initial value is sub-optimal and could be improved. Thus, the data reader could learn the appropriate predetermined period for each data-containing medium that it reads.

If the data reader determines that it is reading data from a data-containing medium that has been written outside of the parameters of the format it may be arranged to generate and/or display an error message.

In the preferred embodiment the data reader monitors 8 tracks. However, it is possible to monitor any number of tracks.

According to a second aspect of the invention there is provided a device capable of reading information, said device including a data reader according to the first aspect of the invention.

The device may be a storage device.

The storage device may be a tape drive, a hard drive, a CD-ROM, a DVD ROM/RAM, or any form of storage arranged to have data read from a number of tracks.

Alternatively, the device may be a telephone (and in particular a mobile telephone), or any other such device that can make use of a data reader according to the first aspect of the invention.

According to a third aspect of the invention there is provided a method of reading a plurality of data tracks from a data-containing medium. The method comprises detecting a first marker from information in one of the tracks and then searching for a second marker from within information read from the each of the tracks. If the second marker has not been detected in one or more of the tracks after a predetermined period has elapsed from receipt of the first marker from any one of the tracks, a determination is made as to whether a marker should have been detected in the or each track.

An advantage of such a method is that it can reduce the likelihood of missing a marker.

Preferably, the data are concurrently read from the data tracks.

The method may comprise setting a flag, or the like, once a marker has been detected for a particular track. Such a method is convenient because it allows the receipt of the markers to be tracked. The flag may be a bit, a state of a state machine, a register, or the like.

The method may provide a flag for each data track.

Further, the method may comprise setting the flag for a track if it is determined that a marker should have been received, but the flag for that track remains un-set.

Alternatively, or additionally, the method may comprise timing when the flag is set for each track. An advantage of this method is that it can be determined whether or not data have been written to the data-containing medium according to the data format. It will be appreciated that the format will specify delays that are permissible between the tracks. If these delays are exceeded, the data have been written out of format.

The data in each track may be provided as a series of data sets. The method may comprise detecting a marker in relation to each data set. Such a method is advantageous because it allows reading of a data set to be specifically tailored to that particular data set.

The above and still further objects, features and advantages of the present invention will become apparent upon consideration of the following detailed descriptions of several specific embodiments thereof, especially when taken in conjunction with the accompanying drawings.

DETAILED DESCRIPTION OF THE DRAWING

Figure 1:
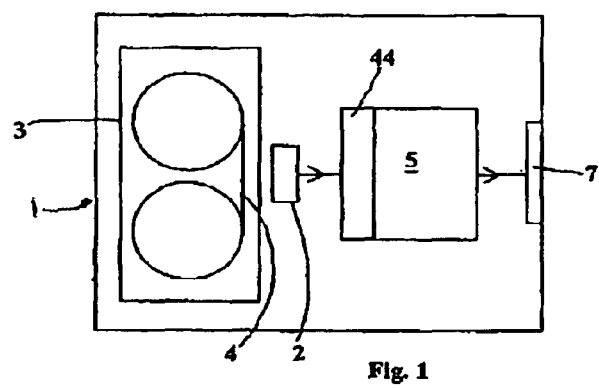
FIG. 1 is a schematic diagram of a tape drive according to a preferred embodiment of the present invention.

FIG. 1 is a schematic diagram of the main components of a magnetic tape storage device 1. A magnetic tape 4 contained in a housing 3 provides the data-containing medium upon which data is stored. A read head array 2 is provided to read data from the tape 4 and produce a data signal fed to processing circuitry 5. The processing circuitry 5, in general, communicates with external devices via a port 7. It is to be understood that storage media other than magnetic tape can be used.

Figure 2:
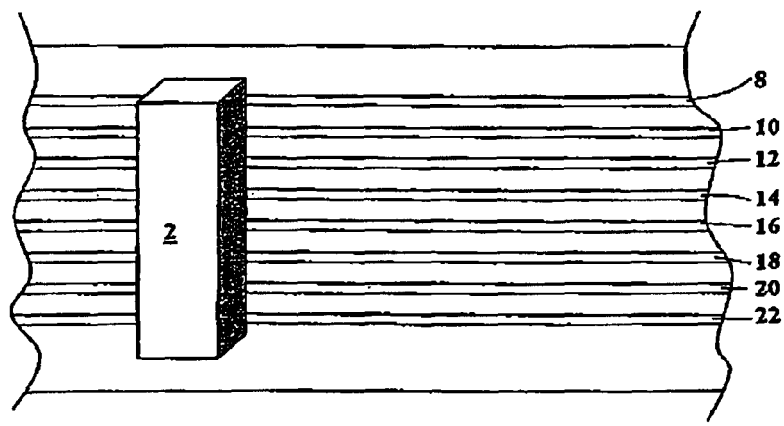
FIG. 2 is a schematic diagram of data tracks held on a portion of tape capable of being read by the tape drive of FIG. 1.

A section of the tape 4 is schematically shown in FIG. 2. The tape 4 contains a number of tracks 8–22 arranged linearly along the length of the tape 4. In this embodiment there are eight tracks and the read head array 2 comprises eight read heads arranged such that one read head can read one of the tracks 8–22.

Thus, as the tape 4 is moved past the read head array 2 eight data streams are produced. That is, one data stream is produced for each of tracks 8–22 on the tape 4.

Figure 3:
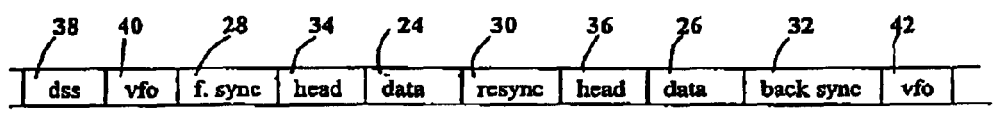
FIG. 3 is a schematic diagram of the structure of data held within a track of FIG. 2.

As shown in FIG. 3 the data within each track 8–22 are stored in a set format. Although the relative sizes of the blocks on the tape are not shown to scale, the data blocks 24,26 form only a portion of the signals held within the track 8–22. Synchronisation, or sync. fields 28,30,32 are provided to facilitate the detection of the headers 34,36. The fields so far described form a dataset.

In addition to fields so far mentioned there are Data Set Separator fields (DSS) 38, which separate data in one dataset from that in another. Each of DSS fields 38 comprises a known data pattern and in this embodiment comprises the repeated nine bit binary pattern 100 000 000. This pattern can be repeated a varying number of times depending upon the position of the DSS field 38 within the data.

Following the DSS field 38 there is a variable frequency oscillator (vfo) field 40, or marker, and there is also a vfo field 42, or marker, immediately after the dataset has finished. Although not shown in the Figure the vfo field 42 following the dataset is itself followed by a DSS field. The end of the vfo field 40, marker, signifies that data are about to be received.

The vfo field comprises a known bit sequence that varies according to its position relative to the dataset (i.e. whether it is at the beginning of the dataset, or whether it is at the end of the dataset). However, each vfo field 40,42 comprises an introductory bit sequence of 000010 followed by a predetermined number of the bit sequence 101010. The predetermined number being determined by the location of the vfo field 40,42. Therefore, the vfo fields 40,42 primarily comprise the bit sequence 010101010.

Processing circuitry 5 of the tape drive includes plural track readers, each dedicated to one of the tracks to be read. Each track reader includes a synchronous adaptive finite impulse response (FIR) filter 44, which must be trained for each data set that is read from the tape 4. To correctly train the adaptive FIR filter 44 suitable training data is required. The DSS field 38 and the vfo fields 40,42 are not spectrally rich and thus, are not suitable for training and therefore, the filter 44 is not trained until the vfo field 40 has finished. However, it can be problematic to detect the vfo fields 40,42 within the other data held on the tape, and in the worst case scenario it is possible that the processing circuitry 5 fails to detect the start and/or the finish of the vfo field 40.

Figure 4:
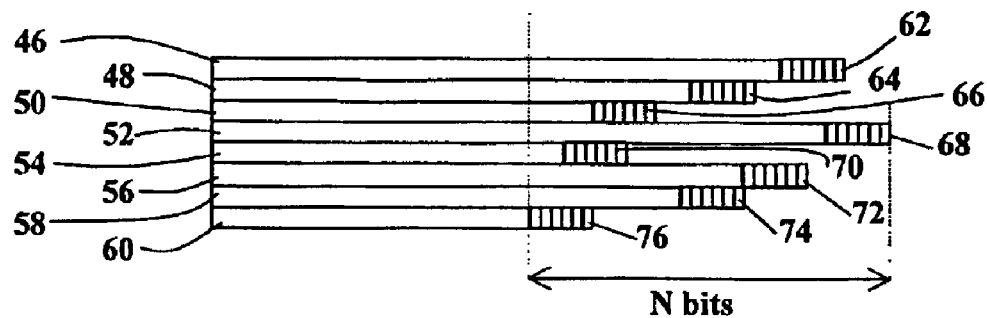
FIG. 4 is a schematic diagram of how data within the tracks of FIG. 2 can arrive at different times.

It will be appreciated that the eight tracks of data 8–22 produce eight streams of information from the read head array 2, and that the beginning of the vfo fields 40 can be temporally dispersed relative to one another, as shown in FIG. 4. In FIG. 4 the eight bars 46–60 represent the eight information streams generated by the read head array 2. The shaded sections 62–76 of the bars 46–60 represent the vfo field 40 within the respective information stream, and it can be seen that the vfo fields 40 occur at different times within each information stream and are covered by a spread of N bits, i.e. the maximum allowable spread under the format.

The temporal dispersal of the vfo fields 40 in each of the tracks relative to one another occurs at the time of writing of the data to the data-containing medium. The dispersal is caused by a number of factors including: delays in the electronics used to write the data (which can be different for each track written); and mechanical displacement of the eight write heads relative to one another.

However, within the format definition, all of the vfo fields 40 should be received within N bits of one another. If a vfo field 40 has not occurred in one of the information streams 46–60 within N bits of the first received vfo field 40 on the other information streams, it can be assumed that the vfo field 40 has been missed within that information stream 46–60. (The other possibility is for the data to have been written outside the format).

Each track reader is associated with a register that is set once a vfo field 40 has been detected for that particular information stream 46–60. Once the register has been set, the FIR filter 44 is trained using the header and data information for the data that are then received. Thus, the FIR filter 44 has been specifically trained for when the dataset is received. However, if the vfo field 40 has been detected on the majority of tracks 8–22, but the register for some of the tracks 8–22 has not been set within N bits of the first vfo field being received, then the unset registers are set, and it is assumed that the information being read from that/those tracks is vfo field 40.

If a particular register remains unset after the N bit period has elapsed, it is likely that the start of the vfo field has been missed. A consequence of this is that the FIR filter 44 will not be correctly trained once the vfo field 40 has finished, ready to receive the data; consequently data are likely to be lost. If the register is set because of the time out of the N bits, there is a chance that the FIR filter 44 can be successfully trained in readiness to receive the data. If the FIR filter 44 cannot be successfully trained, the decoding electronics provided for that particular track 8–22 is the correct state to receive the vfo field 40 associated with the next dataset and therefore, the likelihood of receiving subsequent datasets is increased.

Figure 5:
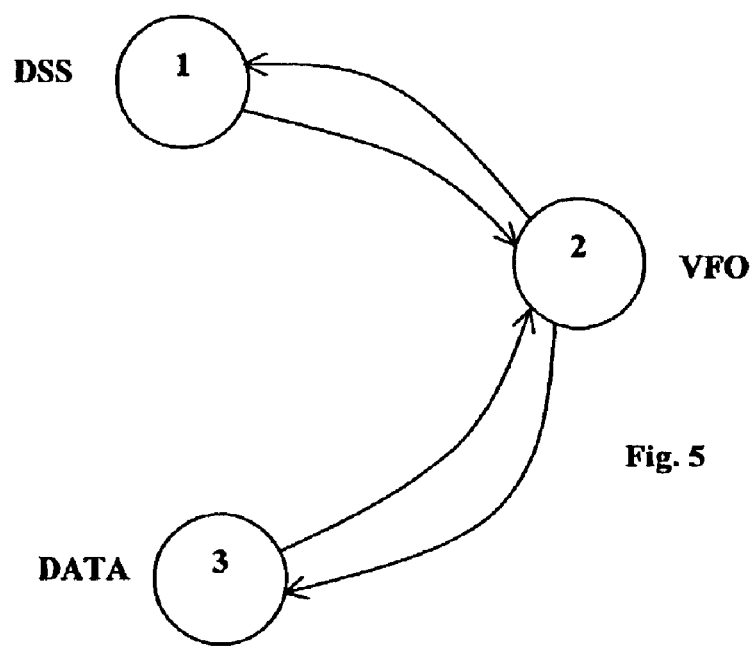
FIG. 5 is a state machine diagram of a process running within the tape drive of FIG. 1.

FIG. 5 is a state diagram for the possible states of the track reader associated with each track 8–22 can exist. In state 1 the track reader is receiving a DSS field 38, i.e. waiting to receive a vfo field 40, or marker. In state 2, the track reader is receiving a vfo field 40 and is therefore waiting to receive data, and in state 3 the track reader is receiving data 34, 26, and thus has received a vfo field 40,42, or marker.

Figure 6:
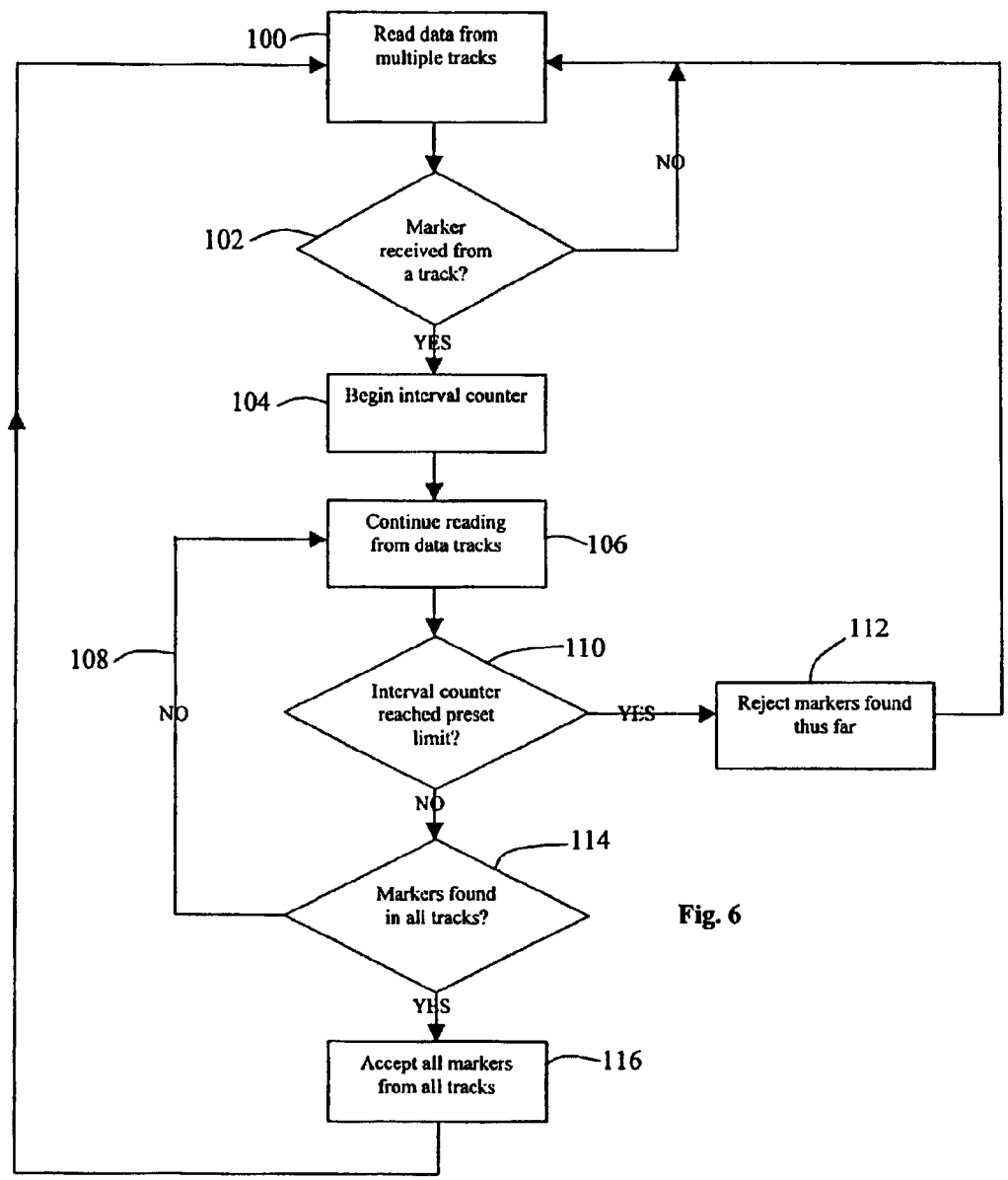
FIGS. 6 and 7 are flow charts detailing two different programs for operating the tape drive of FIG. 1 in accordance with two preferred embodiments of the invention.
Figure 7:
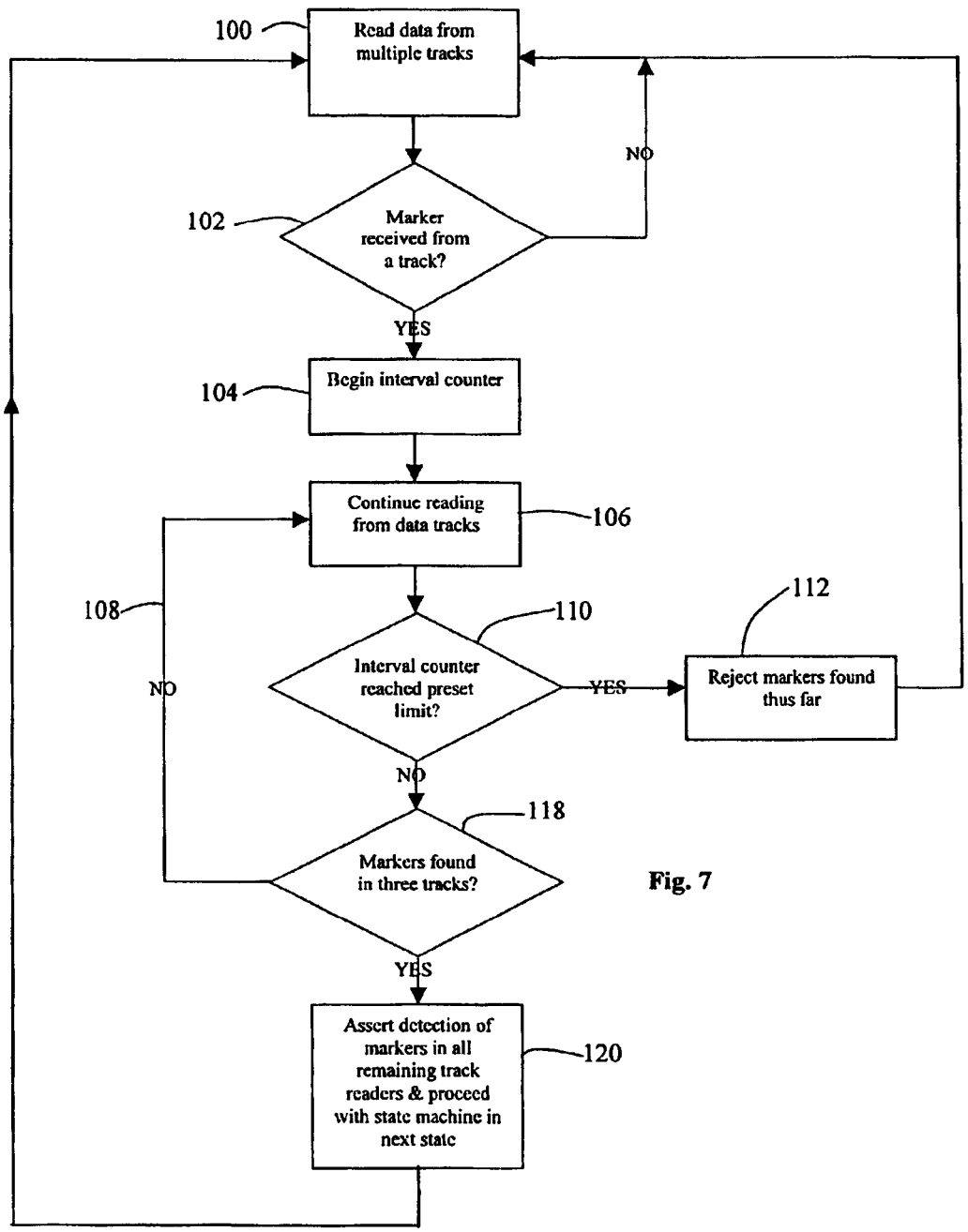

FIGS. 6 and 7 are flow diagrams for two different marker detection operating programs for processors. FIGS. 6 and 7 are described in connection with the description of the state diagram of FIG. 5. Processor 5 accepts markers in accordance with FIG. 6 only if all of tracks 8–22 have a marker with an N bit period. FIG. 7 includes the steps for marker detection wherein markers are accepted in all of tracks 8–22 if markers are detected in three of the tracks within an N bit period.

The common portions of FIG. 6 and 7 are now described. During block 100 head array 2, FIR filter 44 and processor 5 read data simultaneously from tracks 8–22 of data-containing medium 4. Processor 5 continuously monitors (during step 102) for a marker, in this case a vfo field 42. Once processor 5 detects a marker the processor starts an interval counter included therein (step 104) to count the maximum allowable bits for a window in which markers should occur (a fixed number of bits, N). Processor 5 continues to read data from data-containing medium 4 once the counter has been started (step 106). From step 106, the program of FIGS. 6 and 7 proceeds to step 110 during which processor 5 determines if the interval counter has reached its maximum count of N. While the interval counter is running, i.e., has not reached a count of N, the program continues around loop 108 so processor 5 continues to read data during step 106 and then checks as to whether the interval counter has reached its preset limit of N bits. If the markers are still within the loop 108 when the interval counter reaches N bits, processor 5 rejects any markers received thus far during step 112, and the program returns to the beginning step 100, i.e., reading data from data-containing medium 4.

It is from this point that the programs shown in FIGS. 6 and 7 differ, and this is in the manner they allow exit from the loop 108. When processor 5 is programmed in accordance with FIG. 6, the processor during step 114 determines if a marker is found in all of the tracks 8–24. If processor 5 determines during step 114 that a marker was found in each of tracks 8–24 before the interval timer reached its maximum count (step 110) processor 5 advances to step 116 during which the processor accepts all markers from tracks 8–27.

The program of processor 5 then returns to step 100. If, however, processor 5 determines during operation 116 that markers have not been found in all of tracks 8–22 the program returns to track reading step 106. Operation continues in this manner until the maximum count of the interval counter is reached or a marker is found in each of tracks 8–22, which ever occurs first. If the interval counter reaches its maximum count first, processor 5 reaches step 112, during which processor 5 deletes, from a memory of the processor, the markers it has been processing and storing, i.e., the markers are rejected. The program of processor 5 then returns to step 100. Processor 5 resets the interval counter to an initial condition, e.g., zero, as it leaves steps 112 and 116.

When processor 5 is programmed in accordance with the flow diagram of FIG. 7, steps 118 and 120 replace steps 114 and 116. In FIG. 7, loop 114 is exited in response to processor 5 detecting markers in any three of tracks 8–22 during step 118, prior to the interval counter reaching a count of N, as detected during step 110. In response to processor 5 detecting, during step 118, that three of tracks 8–22 have markers the program advances to step 120, i.e., loop 108 is exited. During step 120, processor 5 asserts a marker in the data the processor is processing for each of the five remaining tracks; e.g., if processor 5, during step 118, detects markers in tracks 8, 14 and 18, the processor, during step 120, modifies the data the processor is handling for tracks 10, 12, 16, 20 and 22 to include marker bit sequences. Processor 5 returns to data reading step 100 after completion of steps 120.

However, in the program of FIG. 7 markers are located on only three of the tracks 118, before the loop 108 exits. Once the loop exits markers are asserted in the five tracks in which no marker has yet been detected 120 and the method returns to the beginning 100.

Processor 5 includes a state machine for each of the track readers the processor includes for tracks 8–22. The state machines, as shown in FIG. 5, move between the DSS state 1, vfo state 2 and receiving data state 3 depending upon the fields within the information being read from tape 4. However, if the data reader determines that a particular track reader is occupying an incorrect state, the data reader causes the track reader to change state. For example if a particular track reader is in the "receiving data state," but processor 5 determines that that particular track reader has incorrectly detected a vfo field 40, the processor moves the state machine back to the "receiving marker" state. This situation is indicated on the flow charts of FIGS. 6 and 7 by reject markers step 112. Further, if processor 5 has activated the majority of the state machines for tracks 8–22 to the "receiving marker" state, but one or more state machines remain in the "waiting for marker" state, the processor moves those one or more state machines to the "receiving marker" state. This is the situation that occurs in FIG. 7 during step 120 when processor 5 asserts markers into the remaining track readers and proceeds with the next state of the state machine.

The skilled person will appreciate that although the program of FIG. 6 causes rejection of the markers if one or more markers are not detected, and the program of FIG. 7 results in acceptance of all the markers if three or more markers are detected, that any other combination of acceptance/rejection of markers is possible.

It will be appreciated that the vfo fields 40,42 are many bits in length, and it is possible for the data 24,26 to contain a string of bits that could coincidentally be identical to a portion of the vfo fields 40,42. Therefore, to detect vfo fields 40, 42 it is necessary for processor 5 to monitor the bits being read from tape 4 for a long enough time period to determine that the bits being read are actually in a vfo field 40, 42 rather than data 24, 26.

Because the vfo fields 40, 42 (which form the markers) across all of tracks 8–22 should all occur within a period of N bits of one another, the period of time that the vfo fields 40,42 must be monitored to ensure correct identification may be reduced by comparing what is received on the other tracks 8–22. If information is being read from tape 4 on all eight of tracks 8–22 (or indeed on less than all eight of tracks 8–22) processor 5 infers that the information being received is likely to be a vfo field 40,42, and the period of time that the information must be monitored can be reduced, whilst maintaining high probability of detection and low probability of false detection. Further, if bits on only one of tracks 8–22 appear to form a vfo field, the likelihood of these bits being data that coincidentally corresponds to vfo field 40, 42 is increased.

In an alternative embodiment the data reader simply monitors when the state machine of each track reader changes state. Thus, the data reader monitors, amongst other state changes, when each track reader moves from waiting for a vfo field (in a DSS field) to receiving vfo field 40. The data reader monitors when each track reader determines that the track reader has received a vfo field 40, 42. From this information the data reader determines whether or not the data that it is reading from the data-containing medium have been written within the specifications for the data format. The data reader can display an error message if it is reading data that have not been written according to the parameters of the data format.

What is claimed is:

1. A data reader arranged to read data from a plurality of parallel, longitudinally extending tracks on a data-containing, longitudinally extending medium, said tracks extending in the same direction as the medium and including data containing markers, said data reader being arranged to detect said markers in said data in each of said tracks and said data reader further being arranged to determine that if a predetermined period has elapsed after a marker has been detected in a first one of the tracks, whether a marker should have been detected on others of the tracks.

2. A data reader according to claim 1, in which the data reader is arranged to read the tracks of data concurrently.

3. A data reader according to claim 2, in which the data reader is arranged to monitor information on the plurality of tracks and use the nature of the received information on the other tracks to help determine whether the received information is a marker that has been received on the others of the tracks.

4. A data reader according to claim 2, in which the data reader is arranged to perform a statistical scheme based upon whether or not markers have been detected on the others of the tracks.

5. A data reader according to claim 2, in which the data reader comprises a separate processing circuit and a track reader for each of the tracks that the data reader is arranged to read.

6. A data reader according to claim 5, in which each track reader is arranged to enter a training mode in which the track reader is trained in response to a marker having been deemed to be received.

7. A data reader according to claim 5, in which each track reader includes a flag that is arranged to reflect the nature of the information being read from the track with which the flag is associated.

8. A data reader according to claim 7 in which the flag associated with a track reader is caused to change state in response to the data reader determining that the flag does not reflect the information that is being read by that track reader.

9. A data reader according to claim 7, in which the data reader is arranged to handle data according to the state of the flag.

10. A data reader according to claim 7, in which the data reader is arranged to time when the flags associated with each track reader change state.

11. A data reader according to claim 10, in which the data reader is arranged to adapt the predetermined period for a particular data-containing medium.

12. A device including a data reader according to claim 2.

13. A device according to claim 12 that is a data storage device.

14. A method of reading a plurality of parallel, longitudinally extending data tracks from a data-containing, longitudinally extending medium, the tracks extending in the same direction as the medium, the method comprising (1) detecting a first marker from information in one of the tracks, (2) then searching for a second marker from within information read from others of the tracks and (3) if the second marker has not been detected in the others of the tracks after a predetermined period has elapsed from receipt of the first marker, determining whether a marker should have been detected in the others of the tracks.

15. A method according to claim 14, in which the data are concurrently read from the data tracks.

16. A method according to claim 15, which comprises setting a flag in response to a marker being detected for a particular track.

17. A method according to claim 16, which comprises changing the flag for a track if that flag inaccurately reflects the information being read from that track.

18. A method according to claim 17, comprising timing when the flag is set for each track.

19. A method according to claim 16, comprising treating information read from the data-containing medium according to the state of the flag.

20. A method according to claim 15, comprising providing the data as a series of data sets and detecting a marker in relation to each dataset that is received.

21. A processor for processing data read from plural parallel, longitudinally extending data tracks on a data-containing, longitudinally extending medium, the data tracks extending in the same direction as the medium and including markers, the processor being arranged to determine if markers are detected in a predetermined number of the tracks within a predetermined time interval starting with detection of a first marker.

22. The processor of claim 21, wherein the processor is in combination with a transducer for concurrently reading the plural tracks.

23. The combination of claim 22, wherein the predetermined number equals all of the read tracks of the medium.

24. The combination of claim 22, wherein the predetermined number is less than all of the read tracks of the medium.

25. The combination of claim 24, wherein the processor is arranged to assert the marker into the data associated with the tracks that do not have detected markers.

26. The combination of claim 24, wherein the predetermined number is greater than 1.

27. A method of processing data read from plural parallel, longitudinally extending data tracks on a data-containing, longitudinally extending medium, the data tracks extending in the same direction as the medium and including markers, the method comprising determining it markers are detected in a predetermined number of the tracks within a predetermined time interval starting with detection of a first marker.

28. The method of claim 27, wherein the predetermined number equals all of the read tracks of the medium.

29. The method of claim 27, wherein the predetermined number is less than all of the read tracks of the medium and is greater than 1.

30. The method of claim 29 further comprising asserting the marker into the data associated with any track that does not have a detected marker.

31. The method of claim 29, wherein the predetermined number is greater than 1.

32. The method of claim 27, further including concurrently reading data from the plural tracks.

33. A computer-readable medium or a memory for storing a computer program for enabling a processor to process data read from plural data tracks on a data-containing, parallel, longitudinally extending medium, the tracks extending in the same direction as the medium, the program causing the processor to determine if markers are detected in a predetermined number of the tracks within a predetermined time interval starting with detection of a first marker.

34. The medium or memory of claim 33, wherein the predetermined number equals all the read tracks of the medium.

35. The medium or memory of claim 33, wherein the predetermined number is less than all the read tracks of the medium.

36. The medium or memory of claim 35, wherein the predetermined number is greater than 1.

37. The medium or memory of claim 33, wherein the program causes the processor to assert the marker into the data associated with the tracks that do not have detected markers.

* * * * *